W. O. KUHN.
DRIVING MECHANISM FOR MOTOR VEHICLES.
APPLICATION FILED JUNE 6, 1918.
1,341,217.  Patented May 25, 1920.
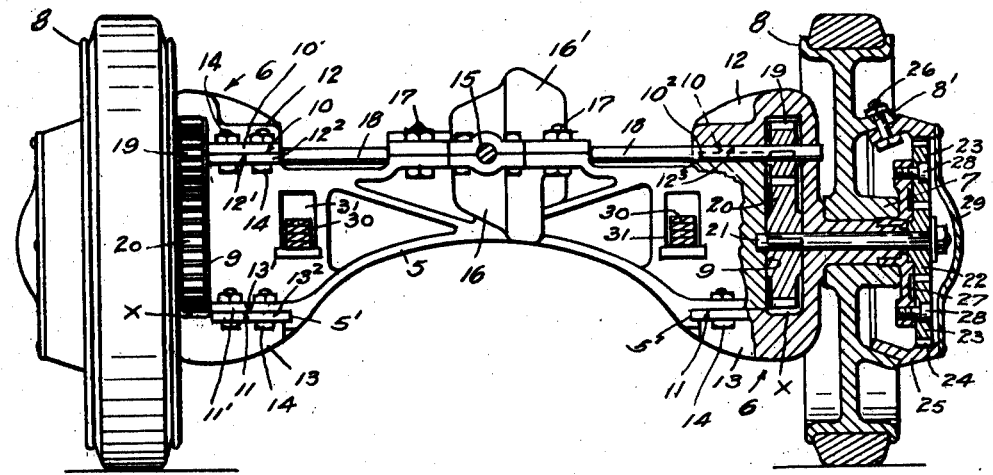
Fig. 1
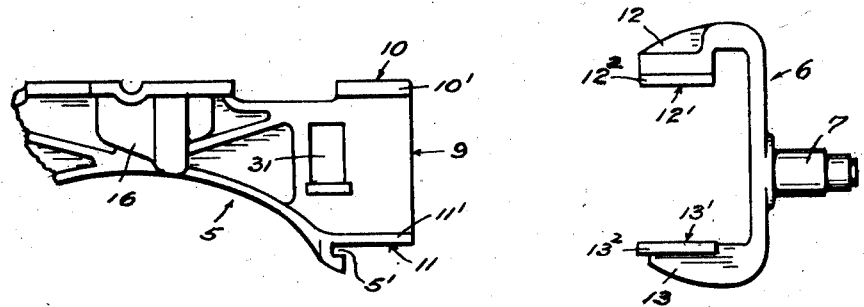
Fig. 2
Fig. 3
INVENTOR:
William O. Kuhn
BY
Pierre James
ATTORNEY

UNITED STATES PATENT OFFICE.

WILLIAM O. KUHN, OF SEATTLE, WASHINGTON.

DRIVING MECHANISM FOR MOTOR-VEHICLES.

1,341,217.   Specification of Letters Patent.   Patented May 25, 1920.

Application filed June 6, 1918. Serial No. 238,429.

*To all whom it may concern:*

Be it known that I, WILLIAM O. KUHN, a citizen of the United States, residing at Seattle, in the county of King and State of Washington, have invented certain new and useful Improvements in Driving Mechanism for Motor-Vehicles, of which the following is a specification.

This invention relates to driving mechanism for motor vehicles.

The object of the invention is the improvement in the devices illustrated in U. S. Patent No. 1,194,140 issued to me Aug. 8, 1916, to render the same suitable for use with rear-drive motor vehicles.

A further object of my invention is to simplify, and improve the efficiency of devices of this character.

The invention consists in the novel construction, adaptation, and combination of parts as will be hereinafter described and claimed.

In the accompanying drawings,

Figure 1 is a view shown partly in front elevation and partly in transverse vertical section of devices embodying the present invention. Fig. 2 is a fragmentary front elevational view of one of the axle members. Fig. 3 is a front elevational view of another of the axle members.

In carrying out my invention, I provide an axle comprising a central body member 5 having secured thereto end members 6 provided with tubular spindles 7 upon which the vehicle's road wheels are journaled.

The member 5 consists of a beam formed of cast steel, preferably, and terminating in surfaces 9 disposed vertically between planed top and bottom bearing surfaces 10 and 11 arranged in substantially rectangular relations thereto. The members 6 are desirably of wrought or forged steel, each of which is vertically forked to provide bifurcations 12 and 13 having opposing surfaces $12^1$ and $13^1$ machined to fit against the respective surfaces 10 and 11 of the member 5.

Flanges $12^2$ and $13^2$ are provided on said bifurcations, the lower one, $13^2$, of each member 6 being of sufficient length to engage in a horizontal groove $5^1$ provided therefor in the adjacent extremities of member 5. Bolts 14 extending through apertures of the flanges $12^2$ and $13^2$ and flanges $10^1$ and $11^1$ provided on the member 5 serve to rigidly secure the axle members 6 to the ends of the member 5. 15 represents a propeller shaft extending into a casing for differential gearing, said casing being formed, preferably, of a lower section 16 which may be cast integral with member 5 and a cap section $16^1$ fastened thereto by bolts 17.

According to the present invention the driving connections between the differential gearing and each of the road wheels 8 includes a shaft 18 extending from the referred to differential gearing through companion journal bearings $10^2$ and $12^3$ provided in the axle members 5 and 6 and into a space X in a member 6. Fixedly secured to shaft 18 is a spur pinion 19 in mesh with a spur gear wheel 20 fixedly secured to a stub-shaft 21 extending axially through the aforesaid spindle 7 to receive outside of the latter a spur pinion 22. Meshing with pinion 22 are gears 23 which, in turn, engage the teeth of an internal gear 24 provided in a ring 25 which is secured, as by means of bolts such as 26 to an annular flange $8^1$ of the adjacent road wheel 8 and constitutes with the aforesaid ring a gear housing. 27 represents a yoke rigidly secured to axle spindle 7 and carries studs 28 which serve as pivots for the gear wheels 23.

29 represents a cover plate detachably connected to the ring 25 to afford a receptacle for grease whereby the various journals and gears within the housing are lubricated.

30 represents springs extending through apertures 31 provided therefor in the axle member 5 for resiliently supporting the chassis of the vehicle to which my improved devices are applied.

Various changes in the form, proportion and minor details of construction may be made within the scope of the appended claim.

What I claim, is—

In a vehicle, the combination with the road wheels, internal gears provided thereon and an axle comprising a central section, two end sections having integral therewith hollow spindles for the respective road wheels, said end sections being formed with bifurcations to embrace the extremities of said central section and afford spaces between the ends of the central section and the respective end sections, and means for rigidly securing the axle's end sections to its central section, of differentially controlled driving shafts, stub shafts journaled in the respective spindles, gears provided in the aforesaid spaces for operatively connecting the driving shafts with the stub shafts, and gears operatively connecting said stub shafts with the internal gears of the road wheels for driving the same.

Signed at Seattle, Washington, this 25th day of May, 1918.

WILLIAM O. KUHN.

Witnesses:
 PIERRE BARNES,
 HANNAH JONES.